W. E. POOLE.
STORAGE BATTERY.
APPLICATION FILED FEB. 20, 1914.

1,114,802.

Patented Oct. 27, 1914.

Witnesses,
C. J. Schmidt,
S. M. Ryan

Inventor,
William E. Poole,
By Offield, Towle, Graves & Offield
Attys.

UNITED STATES PATENT OFFICE.

WILLIAM E. POOLE, OF CHICAGO, ILLINOIS.

STORAGE BATTERY.

1,114,802.  Specification of Letters Patent.  Patented Oct. 27, 1914.

Application filed February 20, 1914. Serial No. 819,875.

*To all whom it may concern:*

Be it known that I, WILLIAM E. POOLE, a citizen of the United States, and a resident of Chicago, in the county of Cook and State of Illinois, have invented certain new and useful Improvements in Storage Batteries, of which the following is a specification.

My invention relates to storage batteries and particularly to improved venting arrangement therefor.

My invention is particularly useful in connection with storage batteries which are apt to be considerably tilted and agitated, as for example when used on vehicles such as motor-cycles, or on boats or air-ships.

The main object is to provide more simple and practicable venting arrangement which will allow ready escape of gases but which will prevent escape of electrolyte.

In accordance with my invention a hollow filling plug is provided for each cell of a battery and a vent tube is extended slantingly from each plug and provided at its outer end with a vent outlet, each plug being threaded into the respective cell cover and the vent tube being threaded at one end into the plug, and the plug being provided with a screw threaded closure cap. These various parts are thus readily separable and can be very readily and quickly applied, removed or replaced.

By reference to the accompanying drawing my invention will be readily understood.

Figure 1:
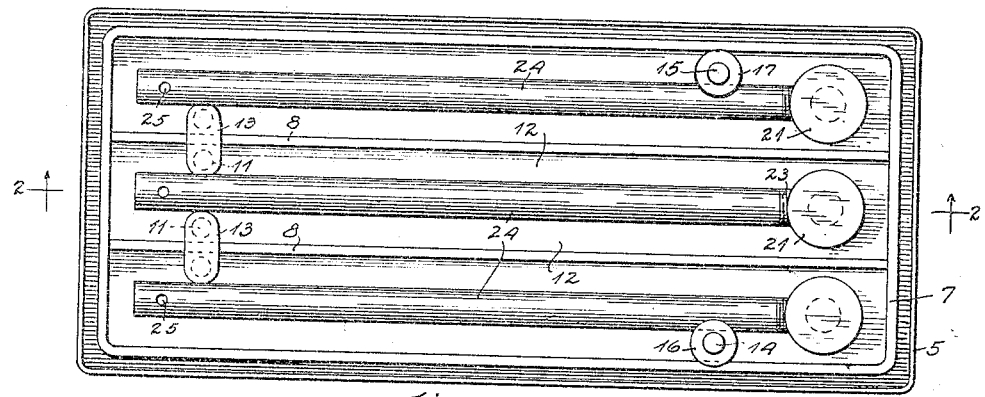
Figure 2:
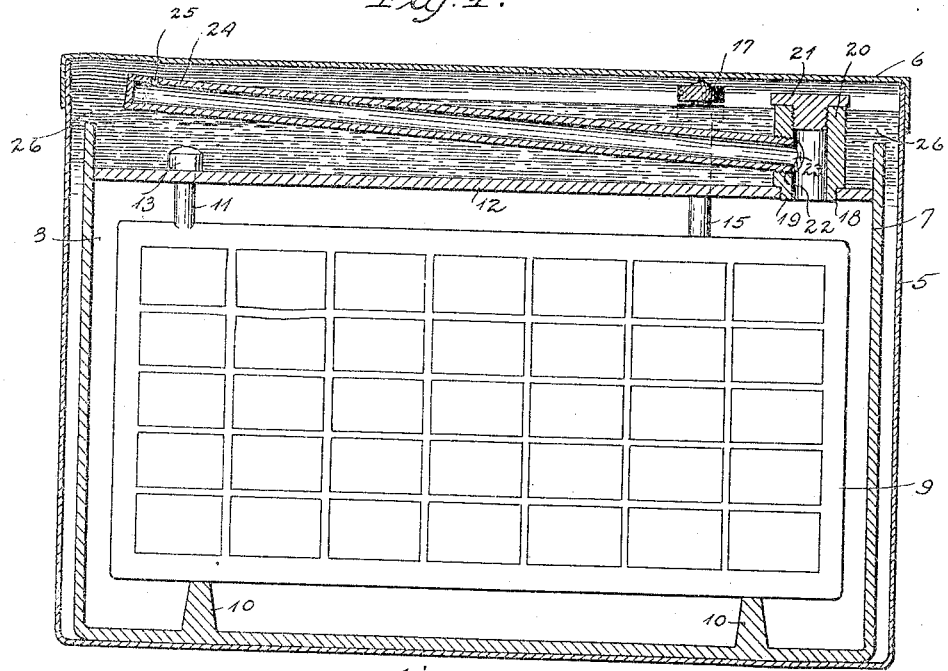
Figure 3:

In this drawing Figure 1 is a plan view of a battery in its casing with the casing cover removed, Fig. 2 is a sectional view on plane 2—2, Fig. 1, and Fig. 3 is a side elevational view of a cell cover and its filling plug and the vent tube extending from the plug.

The containing case or housing 5 is preferably of sheet metal and provided with a cover 6. Within this casing is a battery jar 7 of glass, rubber, or other insulating material, which jar is sub-divided into battery cells by vertical partition walls 8. In each cell are a suitable number of electrode plates 9 mounted on supporting ridges 10 on the bottom wall of the cell in the usual manner, the cell terminals 11 extending outwardly through the cell cover 12, cross connectors 13 connecting these cell terminals and the main terminals 14 and 15 being provided with binding heads 16 and 17. Each cell cover 12 has a threaded opening 18 at one end for receiving the threaded flange 19 of a hollow filling plug 20, these plugs being preferably arranged in a row at one end of the battery, as clearly shown in Fig. 1. Each plug is provided with a sealing cap 21 having threaded engagement therein, and each plug has also a lateral threaded opening 22 for receiving the threaded end 23 of a vent duct or pipe 24, provided at its end with a vent outlet 25 opening upwardly, the vent ducts slanting upwardly from the horizontal.

With the above arrangement the battery can readily vent at all times, the gases passing into the filling plugs and then through the vent ducts and through the vent outlets 25. As the gas passes along the vent ducts any electrolyte held in suspension thereby is condensed and flows down the inclined ducts back into the cells. If the battery is tilted in clockwise direction (Fig. 2) electrolyte will of course enter the filling plugs and the lower ends of the vent ducts, but escape of gases will not be prevented as such gases will work their way through the electrolyte in the upwardly slanting ducts. As soon as the battery returns to horizontal position the electrolyte in the ducts will flow back into the cells. If the battery is tilted in the opposite direction, the filling plugs and vent ducts will of course be free for the escape of the gases, the amount of electrolyte in the cells being such that during such tilting it can not enter the filling plug. There is no chance at any time for any of the electrolyte to escape through the vent outlets 25 owing to the upward inclination of the vent ducts and the position of the outlets in the upper wall of the ducts.

By virtue of the threaded engagement of the filling plugs with the cell covers and the threaded engagement of the vent ducts and closure caps with the plugs, these parts can be readily detached and replaced. If it is desired to fill the cells, the caps can be readily removed. If it is desired to inspect any of the ducts, it can be readily unscrewed. If any of the parts break, new parts can easily be applied. These parts are preferably of material such as rubber which will withstand acid electrolytes.

In order to more fully protect the vent parts and to effectively seal the battery, some suitable composition 26 may be poured into the casing 5 around the battery jar and over the cell covers, and to a level above the lower ends of the vent ducts but below the vent outlets. This composition, after hardening, will effectively seal the battery and the threaded joints and will hold the vent ducts securely in place, the only outlet from the batteries being then the vent passageways for the escape of gases.

I thus produce a very simple venting arrangement for storage batteries which is very effective and efficient in allowing escape of gases but preventing escape of electrolyte.

I do not, of course, desire to be limited to the precise structure and arrangement as modifications may be possible which would still come within the scope of the invention, and

I claim as follows:

1. In a storage battery, an electrolyte containing receptacle, a cover therefor, a filler plug extending from said cover, and a straight vent tube communicating with said plug and extending slantingly upwardly therefrom and having a vent outlet adjacent its highest end.

2. In a storage battery, an electrolyte receptacle having a cover, a hollow filler plug extending from said cover and having detachable connection therewith, a detachable closure cap for said filler plug, and a vent duct having detachable engagement with said plug and communicating with the interior thereof, said duct extending slantingly upwardly and having a vent outlet at its high end.

3. In a storage battery, the combination of a jar subdivided into cells containing electrolyte, a cover for each cell, a hollow filling plug having detachable engagement with each cover. and having a detachable closure cap for its outer end, a vent duct having detachable connection with each plug and communicating with the interior thereof, said ducts being parallel and extending slantingly away from the covers and each terminating in a vent outlet.

4. In a storage battery an electrolyte containing receptacle, a cover therefor, a filler plug extending from said cover, a straight vent tube communicating with and extending from the side of said plug and slantingly upwardly therefrom and having a vent outlet at its high end, and sealing material over said cover and substantially inclosing said filler plug and vent tube but leaving the vent outlet exposed.

In witness whereof, I hereunto subscribe my name this 23rd day of January, A. D., 1914.

WILLIAM E. POOLE.

Witnesses:
SADIE M. RYAN,
JAMES R. OFFIELD.